United States Patent [19]

Morford

[11] Patent Number: 5,779,120
[45] Date of Patent: Jul. 14, 1998

[54] FIREARM SUPPORT

[75] Inventor: Ted Morford, Bozeman, Mont.

[73] Assignee: Big Sky Racks, Inc., Bozeman, Mont.

[21] Appl. No.: 603,720

[22] Filed: Feb. 20, 1996

[51] Int. Cl.⁶ .................................................. B60R 7/14
[52] U.S. Cl. ................. 224/571; 224/311; 224/551; 224/557; 224/569; 224/570; 224/913
[58] Field of Search ................. 224/311, 913, 224/571, 569, 558, 551; 211/64

[56] References Cited

U.S. PATENT DOCUMENTS

| | | | |
|---|---|---|---|
| 2,929,539 | 3/1960 | Safreno | 224/311 |
| 3,473,673 | 10/1969 | Porter | 224/913 |
| 3,802,612 | 4/1974 | Smith | 224/571 |
| 5,129,563 | 7/1992 | Dillon | 224/913 |
| 5,350,094 | 9/1994 | Morford | 224/551 |
| 5,438,787 | 8/1995 | McMaster et al. | 224/913 |

*Primary Examiner*—Linda J. Sholl
*Attorney, Agent, or Firm*—D. L. Tschida

[57] ABSTRACT

An improved, modular firearm support for retaining firearms in close association to a vehicle ceiling. The support includes a formed metal bracket having orthogonal top and back mounting plates and a pair of padded cradles which are fitted to opposite sides of firearm lock and trigger shroud assemblies. An adjustable lock plate offsets the lock from the back plate to fully seat the firearm at the cradles and trigger shroud. Multiple draw clamps are fitted to the back plate to retain the support to a vehicle support, for example, a roll bar, divider panel or a telescoping support, which spans the vehicle. A slide bracket is also provided at the telescoping vehicle support to vary the mounting location of the firearm support. Alternative shrouds are also disclosed to protect either the trigger or other critical firearm parts.

17 Claims, 11 Drawing Sheets

FIREARM SUPPORT

BACKGROUND OF THE INVENTION

The present invention relates to vehicle mounted firearm storage devices and, in particular, to a support which can be closely fitted to a vehicle ceiling from a roll bar, divider panel, or extensible support bar. A clamping firearm lock restrains the firearm to a pair of cradles and a shroud protects the trigger or other critical portions of the firearm.

Varieties of firearm storage devices have been developed over the years for storing, displaying, and containing firearms, for example, handguns, rifles, or shotguns. Many assemblies have been developed to contain long barreled firearms, (e.g. shotguns and rifles) to a vehicle. Most typically, these assemblies are found at law enforcement vehicles. The firearm is typically restrained in an upright condition from brackets secured to the vehicle floor and dashboard. Examples of such storage devices can be found at U.S. Pat. Nos. 3,550,001; 3,727,813, 3,964,612; 4,364,499; and 4,747,280.

A variety of ceiling mounted supports have also been developed. One exemplary support is shown at U.S. Pat. No. 5,116,010. U.S. Pat. No. 5,350,094 depicts other supports that are capable of restraining firearms and other accessories in close association to a vehicle ceiling and which can be fitted to a variety of alternative vehicles.

The later assembly, which is sold by the present assignee, Big Sky Racks, Inc., Boseman, Mont., has found particular acceptance by law enforcement personnel. The support is readily fitted to essentially all vehicles at either available roll bars, compartment partitions or an adjustable telescoping support bar that spans between the vehicle's side walls and is adjustable to fit in close association to the vehicle ceiling.

The subject invention improves on the latter assembly by providing a stamped, flat metal support bracket which separately supports a pair of cradles and intermediate of which a lock and trigger shroud are adjustably mounted. A depending lock plate and slots at the support bracket permit adjustments to fully seat a firearm at the cradles and shroud. The trigger shroud prevents external access to the trigger or other critical portions of the firearm, once mounted to the support, yet does not obstruct release of the firearm. Provisions are made to mount the support to a variety of vehicle supports and vary the mounting location of the vehicle support. The assemblies of the support are modular and can be arranged as desired.

SUMMARY OF THE INVENTION

It is accordingly a primary object of the invention to provide a low profile, vehicle mounted firearm support assembly for restraining a firearm to a variety of vehicle supports, including a vehicle support which restrains the firearm in close association to the vehicle ceiling.

It is a further object of the invention to provide a primary support bracket having orthogonal top and back plates to shelter the firearm.

It is a further object of the invention to provide a support having a lock which clamps about the firearm as the firearm is fully seated to at least one cradle.

It is a further object of the invention to provide a trigger shroud which depends from the primary support bracket to encase the trigger or other critical portion of the firearm when seated to the support.

It is a further object of the invention to include a pair of draw clamps at the primary support bracket to contain the support assembly to a roll bar, telescoping support bar or other support at the vehicle.

It is a further object of the invention to provide adjustable mountings between the trigger shroud, lock plate and cradles and the primary support bracket.

It is a further object of the invention to provide an adjustable slide plates for retaining a telescoping vehicle support to the vehicle.

Various of the foregoing objects, advantages and distinctions of the invention are obtained in a presently preferred assembly. The assembly provides a one-piece stamped metal bracket having back and top plates, which plates extend orthogonal to one another, and which provide a number of slotted apertures for assembly fasteners. A pair of cradles are covered with a cushioning material and are fitted to the top plate. A trigger shroud and a lock support plate are fastened to the top plate intermediate the cradles. The lock plate supports a clamping firearm lock to the top plate. The lock plate, trigger shroud and cradles are adjusted relative to the back plate to fully seat a firearm to the cradles and lock and completely encase the trigger. All assembly fasteners are positioned to be covered by the restrained firearm.

An alternative, "C" shaped shroud also mounts to the firearm support to prevent access to other critical portions of a firearm. For example, the shroud prevents access to retainers at the firearm which permit disassembly of the firearm while restrained to the vehicle support.

Separately mounted to the back plate are a pair of compression clamps which are capable of supporting the assembly to either a roll bar or a telescoping support fitted to span the vehicle. Slide plates that mate with end brackets at the support permit an adjustable mounting of the telescoping support to the vehicle. The support may also be mounted to a curtain divider.

The assembly is normally fit to the vehicle support to place the top plate in close association to the vehicle ceiling to prevent access to any fasteners at the lock plate or trigger shroud. Apertures can also be provided to permit a direct connection of the support bracket to the vehicle ceiling.

Still other objects, advantages and distinctions of the invention will become more apparent from the following description with respect to the appended drawings. To the extent modifications and improvements have been considered, they are described as appropriate. The description should not be literally construed in limitation of the invention, which rather should be interpreted within the scope of the further appended claims.

3

Figure 10:
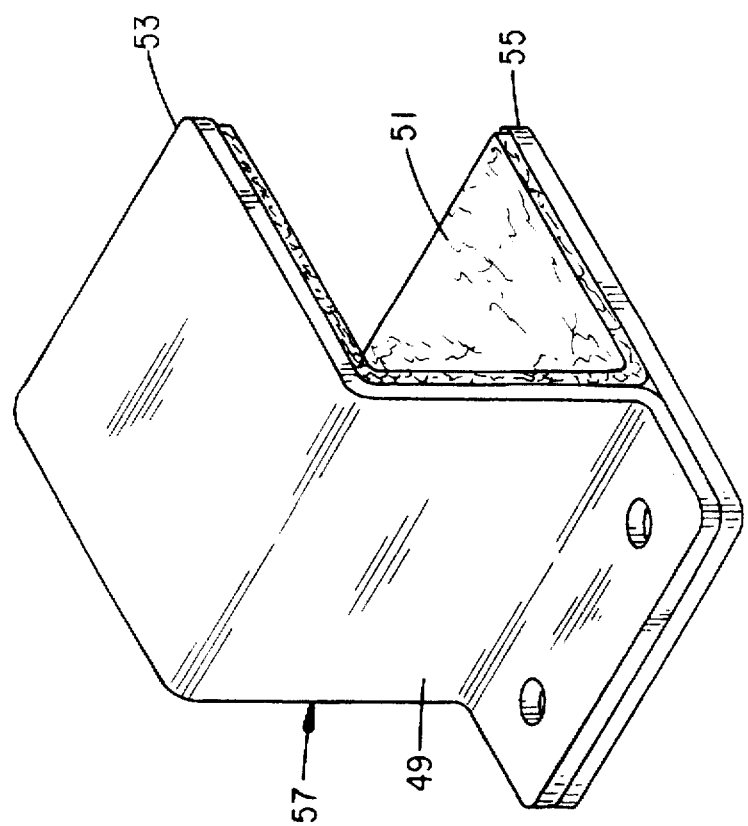

FIG. 10 is a perspective drawing to an alternative shroud used to protect critical firearm parts.

Figure 11:
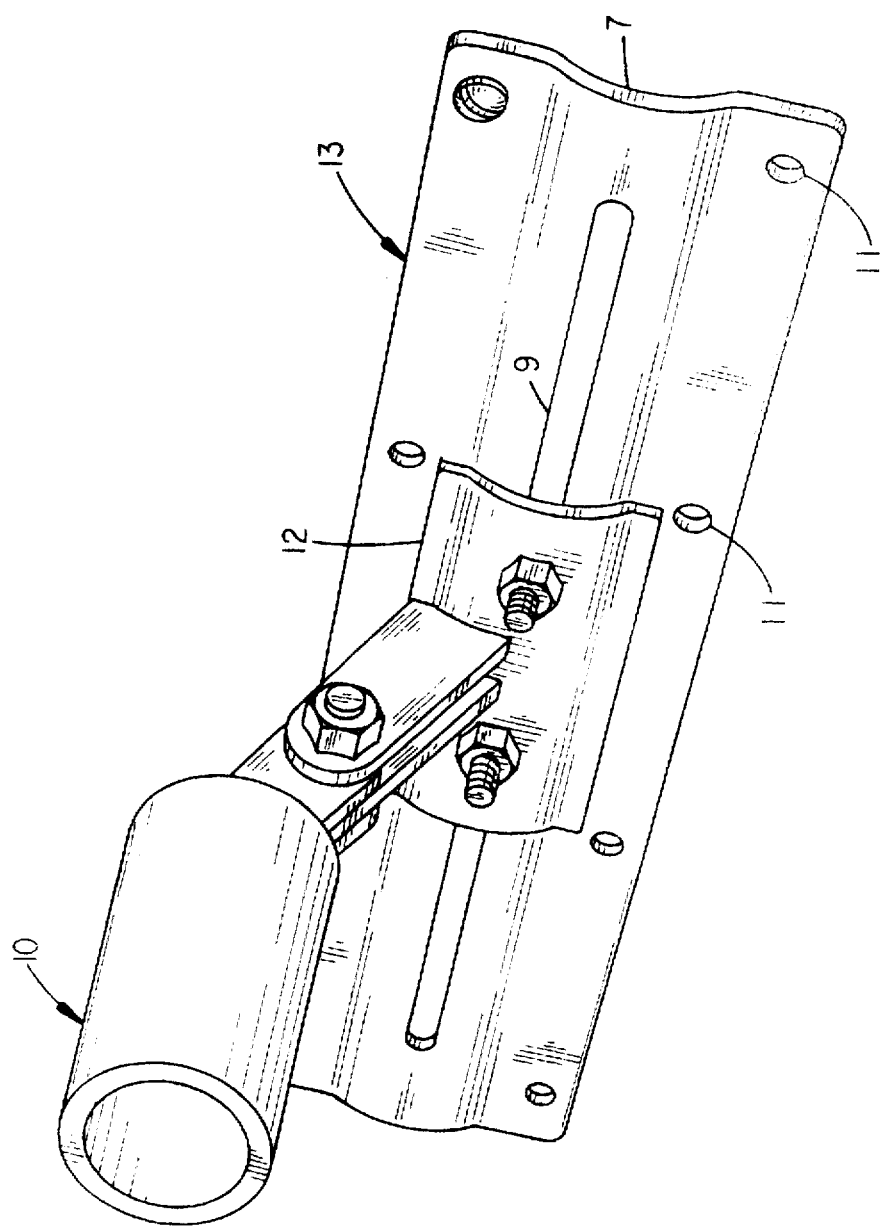

FIG. 11 is a perspective drawing to a slide bracket, which accepts an end bracket of the telescoping vehicle support, and which permits an adjustable mounting of the vehicle support.

DESCRIPTION OF THE PREFERRED EMBODIMENT

Figure 1:
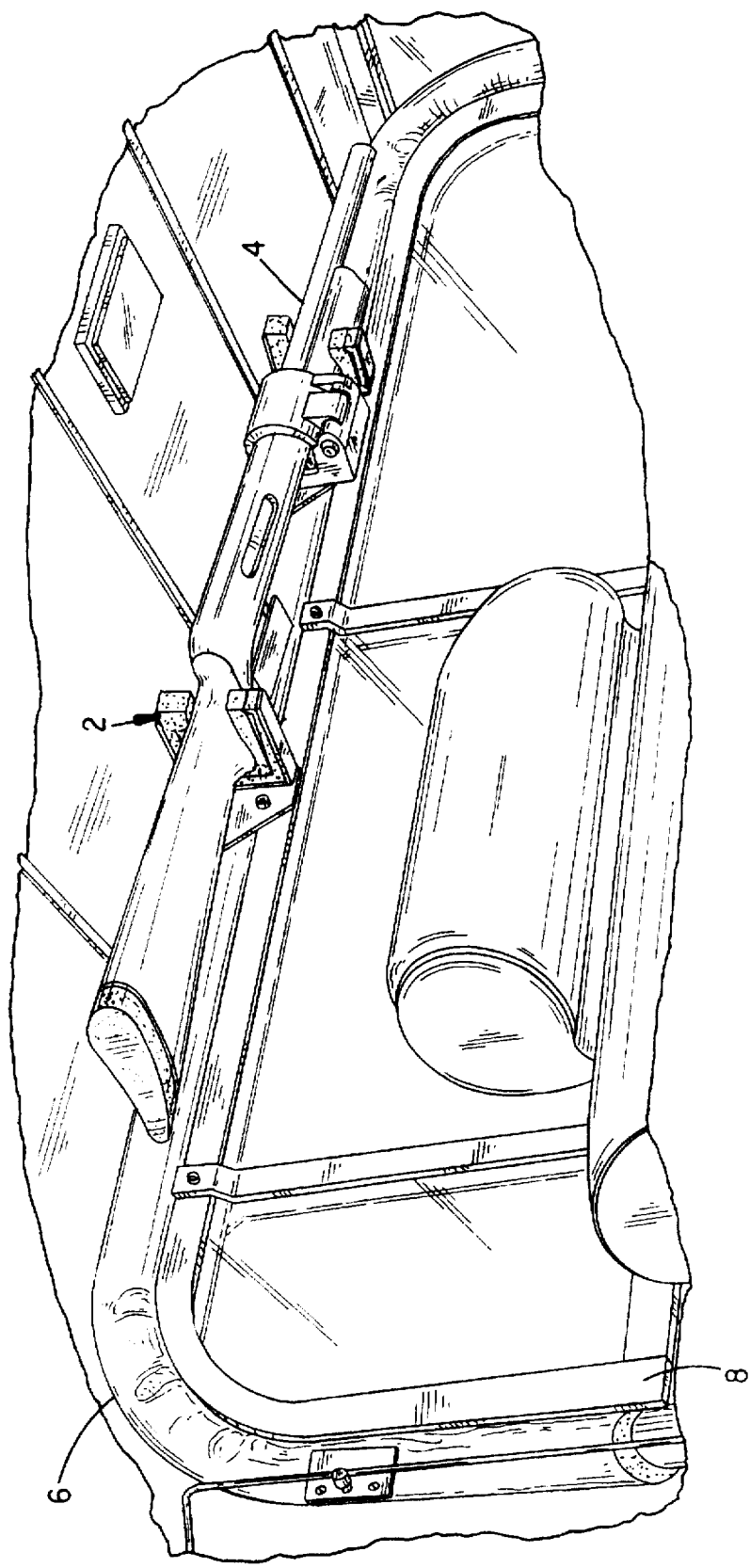
FIG. 1 is a perspective drawing showing the firearm support fitted to a roll bar and a flat panel divider and containing an exemplary firearm.
Figure 2:
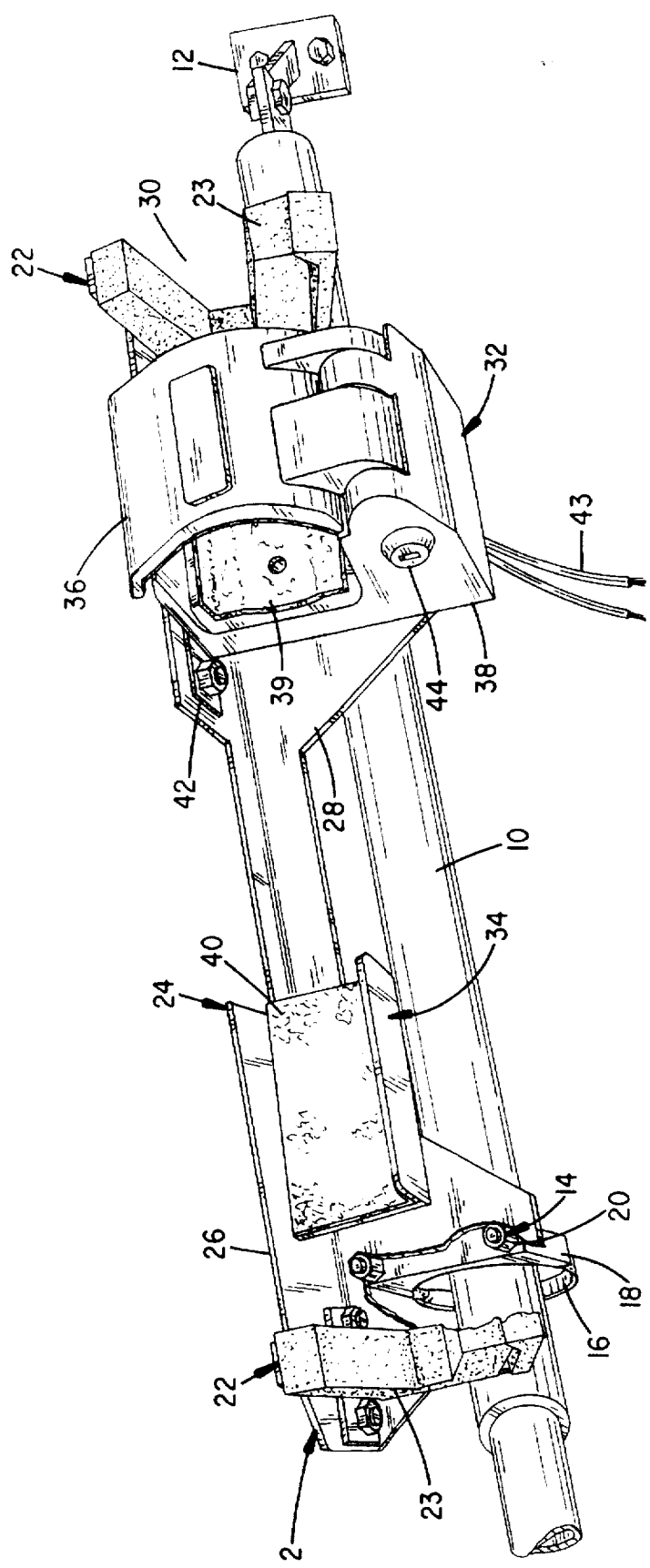
FIG. 2 is a perspective drawing showing the firearm support fitted to a telescoping vehicle support and a cutaway view to a mounting clamp.

With attention to FIGS. 1 and 2, perspective drawings are shown to alternative mountings of the firearm support 2 of the invention and a firearm 4 at a typical passenger vehicle shown in cutaway, which most typically is either a pick-up truck or a sedan type automobile. The firearm support 2 of FIG. 1 is fitted to a roll bar 6 and from which a transparent vehicle divider panel 8 depends. In lieu of a transparent divider 8, a screen divider might be used.

Although a divider panel 8 is shown with the roll bar 6, for many vehicles, only a roll bar 6 is used. Similarly, for many sedan type automobiles, only a divider panel 8 might be used. The firearms support assembly 2, however, is adaptable to either the roll bar 6 by itself, the panel 8 by itself, or the two in combination.

The support assembly 2 may also be secured direct to the vehicle ceiling or to a telescoping support bar 10 shown at FIGS. 2 and 11 and also at U.S. Pat. No. 5,350,094. With attention to FIG. 2, the firearm support 2 is fitted to a telescoping support 10 that extends between the sidewalls of a vehicle (not shown). End brackets 12, only one of which is shown, retain the ends of the support 10 to the vehicle and can be adapted to essentially all vehicles to provide a close fit mounting of the support 10 and a supported firearm 4 to the vehicle ceiling.

FIG. 11 shows the support 10 as it appears when mounted to a further mounting bracket 13. The bracket 13 is secured to the vehicle with fasteners at a number of apertures 15. Bolts at the bracket 12, in turn, are mounted to a slot 9 at a raised slideway 7 to permit adjustment of the support 10. The bracket 13 finds advantage when securing the support 2 to a variety of vehicles which have limited or inconveniently located struts at the vehicle, frame that are capable of receiving fasteners. With the mounting of the bracket 13, the vehicle support 10 and support 2 can be adjusted forward or backward to properly position the firearm 4 relative to the driver.

Returning attention to FIG. 2 and shown in cutaway is one of a pair of threaded draw clamps 14, see also FIGS. 5 through 9, which retain the support 2 to the bar 10. A "U" shaped threaded yoke arm 16 and clamp bracket 18 compressively retain the support 2 to the bar 10 upon tightening lock nuts 20. The clamps 14 can also be used to retain the support 2 to the roll bar 6 or the panel divider 8.

The support 2 generally provides a pair of cradles 22 having cushioned covers 23 which extend from a support bracket 24. The bracket includes orthogonal top and back plates 26 and 28. The cradles 22 provide recessed cavities 30 which cradle the stock and forearm of the typical long barreled firearm 4, such as a shotgun or rifle. The covers 23 provide a pliable support, which prevents marring or scratches at the firearm 4, and which can occur with normal vehicle movement.

Intermediate the cradles 22 is a keyed lock assembly 32 and a trigger shroud 34. The lock 32 includes a clamp arm 36 which is pivotally mounted to a lock body 38 that contains a support cushion 39. A spring (not shown) biases the arm 36 away from a latch position with the body 38. The lock 32 can be operated either with a key or via an electronic switch which disengages a latch pin.

The trigger shroud 34 depends from the top plate 26 and is sized to completely cover the trigger of the firearm 4 and thereby prevent any possible discharge of the firearm 4 while retained at the support 2. A cushion 40 is also fitted to the trigger shroud 34 to prevent marring the firearm 4.

Although a preferred construction of the firearm support 2 includes a pair of cradles 22 in combination with the lock 32 and trigger shroud 34, the modularity of the support 2 permits arrangements where one of the cradles 22 and/or possibly both cradles 22 are removed. In the latter instances, support for the firearm 4 is obtained from the lock 36 and/or the trigger shroud 34. A variety of mounting configurations are thus obtainable with the support 2.

Figure 3:
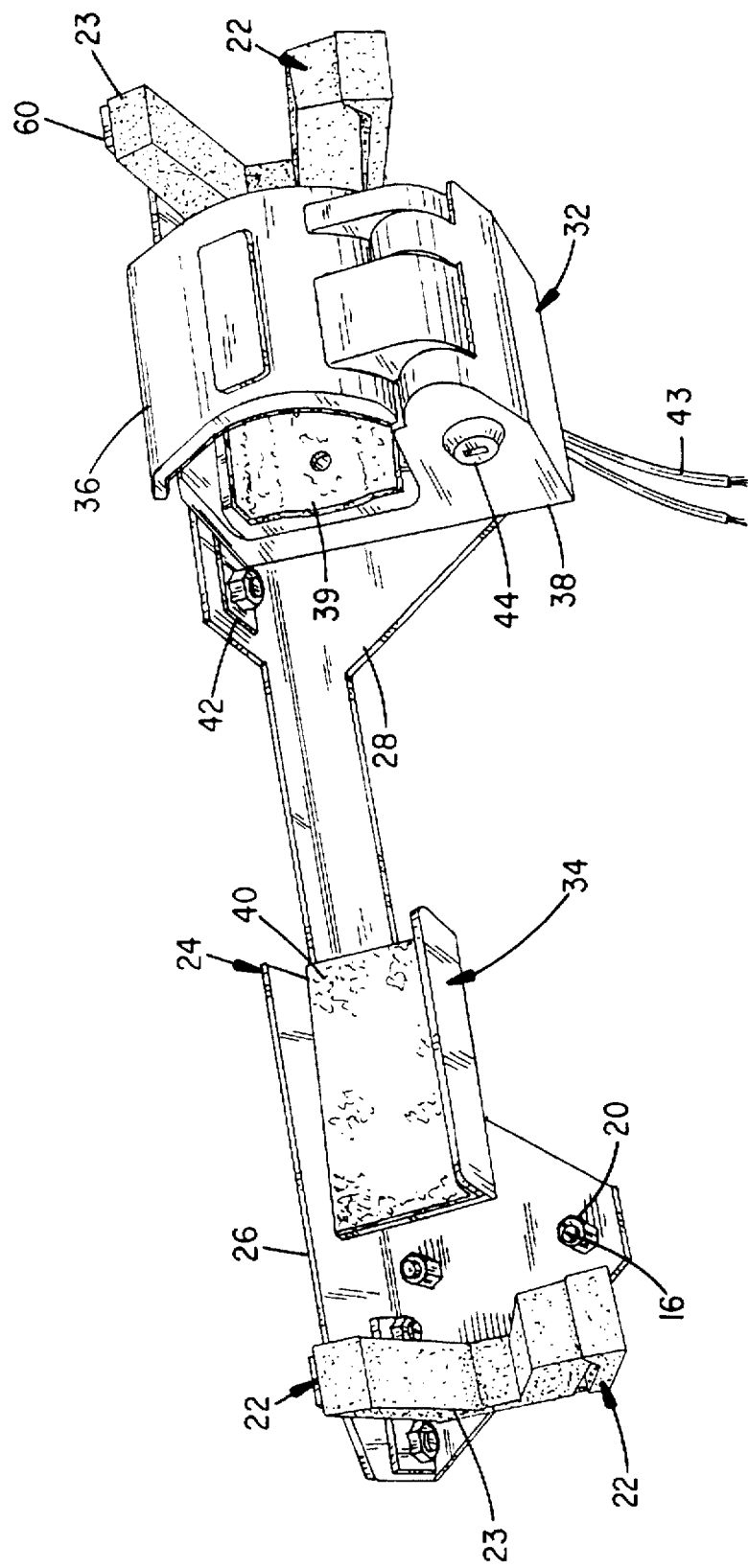
FIG. 3 is a perspective drawing of the support assembly including a firearm lock.
Figure 4:
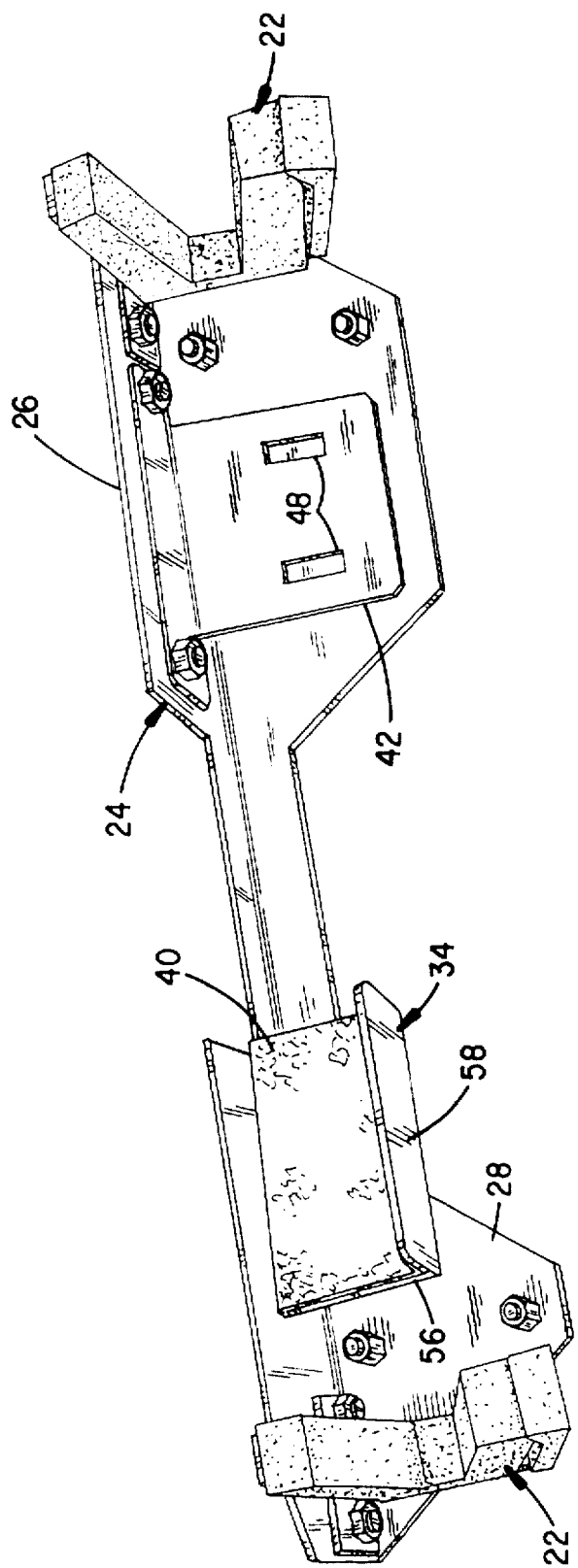
FIG. 4 is a perspective drawing showing the support assembly without a lock.
Figure 5:
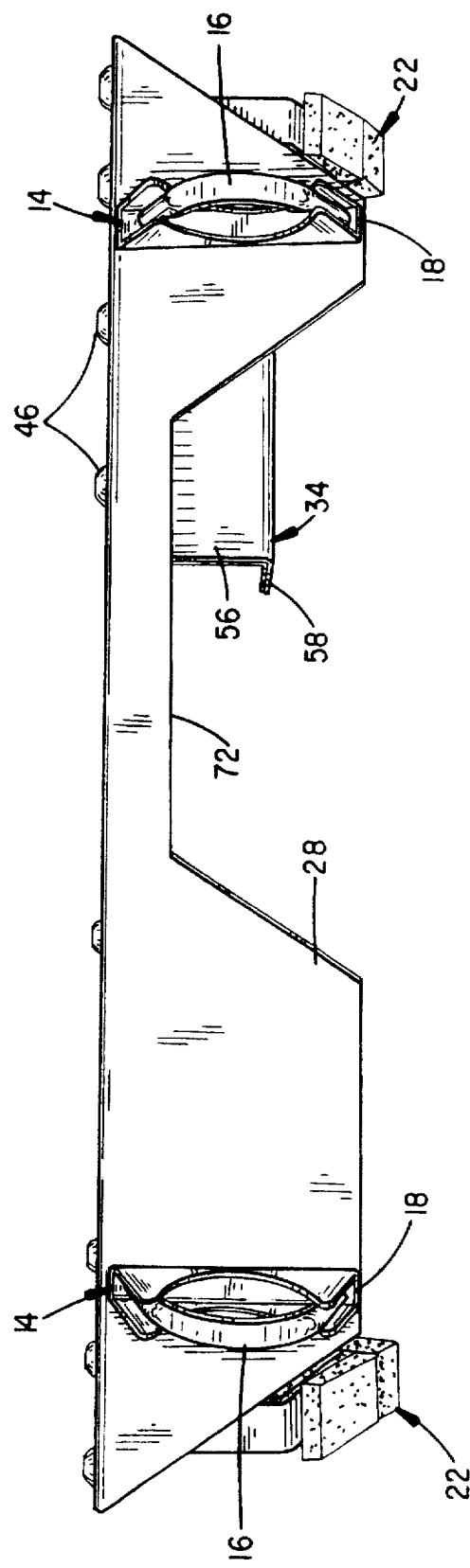
FIG. 5 is a rear view plan view of the support assembly.

With attention to FIGS. 3 through 9, a number of perspective and plan views are shown to the detailed construction of the firearms support 2. FIGS. 3 and 4 depict the relationship of an adjustable lock plate 42 that depends from the top plate 26 and which retains the lock 32 to the primary support bracket 24. The clamp arm 36 pivots from the lock body 38 in response to a keyed tumbler 44 which is fitted to engage a pivot pin (not shown) which contains the clamp arm 36 to the body 38. Electrical signals may also be applied via conductors 43 to a solenoid (not shown) contained in the body 38 and which cooperates with the pivot pin to provide a redundant latch action.

The lock 32 is retained to the lock plate 42 with a number of threaded fasteners 46 at a pair of slotted apertures 50. Two sets of slotted apertures 50 and fasteners 46 at the top plate 26, reference FIG. 6, separately retain the lock plate 42 to the bracket 24 and permit adjustment of the relative angle and displacement of the lock plate 42 to the bracket 24. The vertical position of the lock 32 relative to the cradles 22 is adjusted at the slots 48. Preferably the lock plate 42 and the lock 32 are adjusted to fully seat a firearm 4 within the cradles 22 and against the cushions 23.

Figure 6:
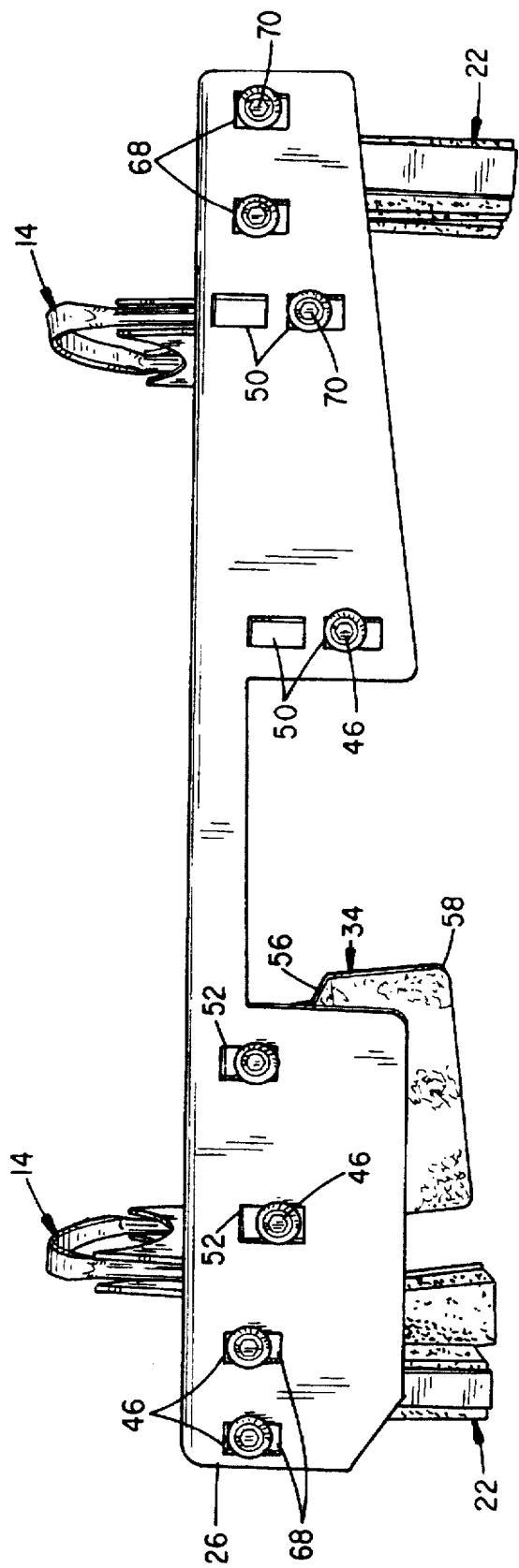
FIG. 6 is a top view of the firearm support.
Figure 7:
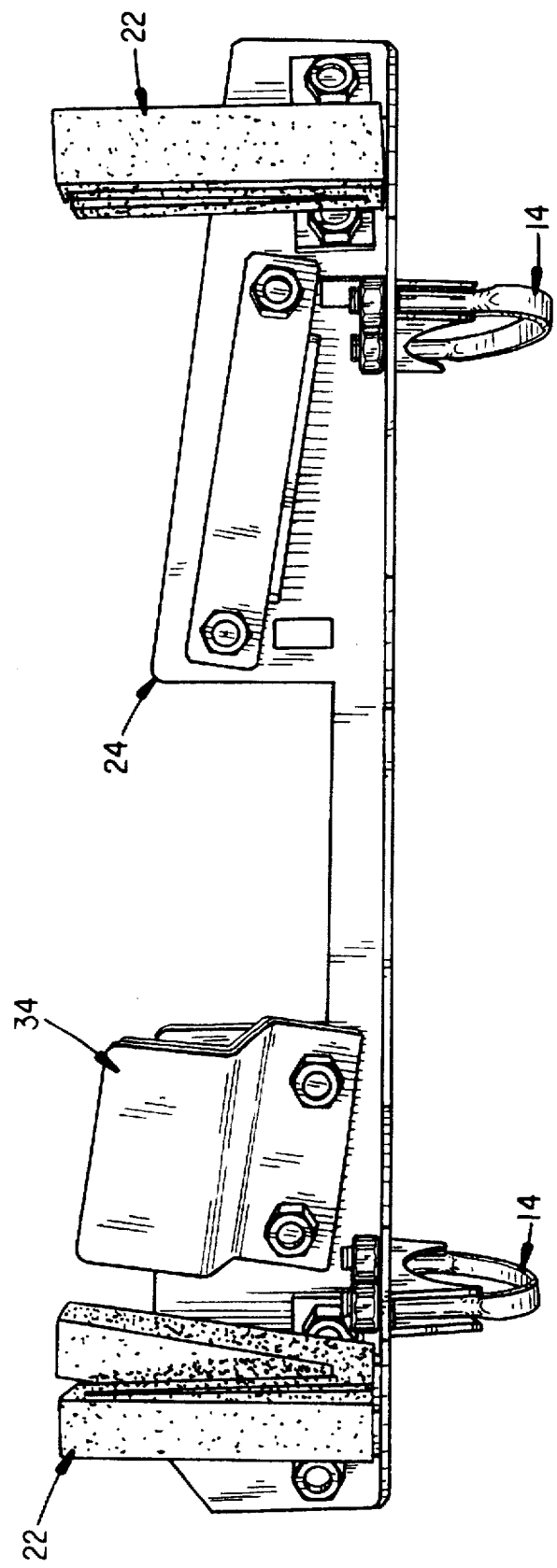
FIG. 7 is a bottom view of the firearm support.
Figure 8:
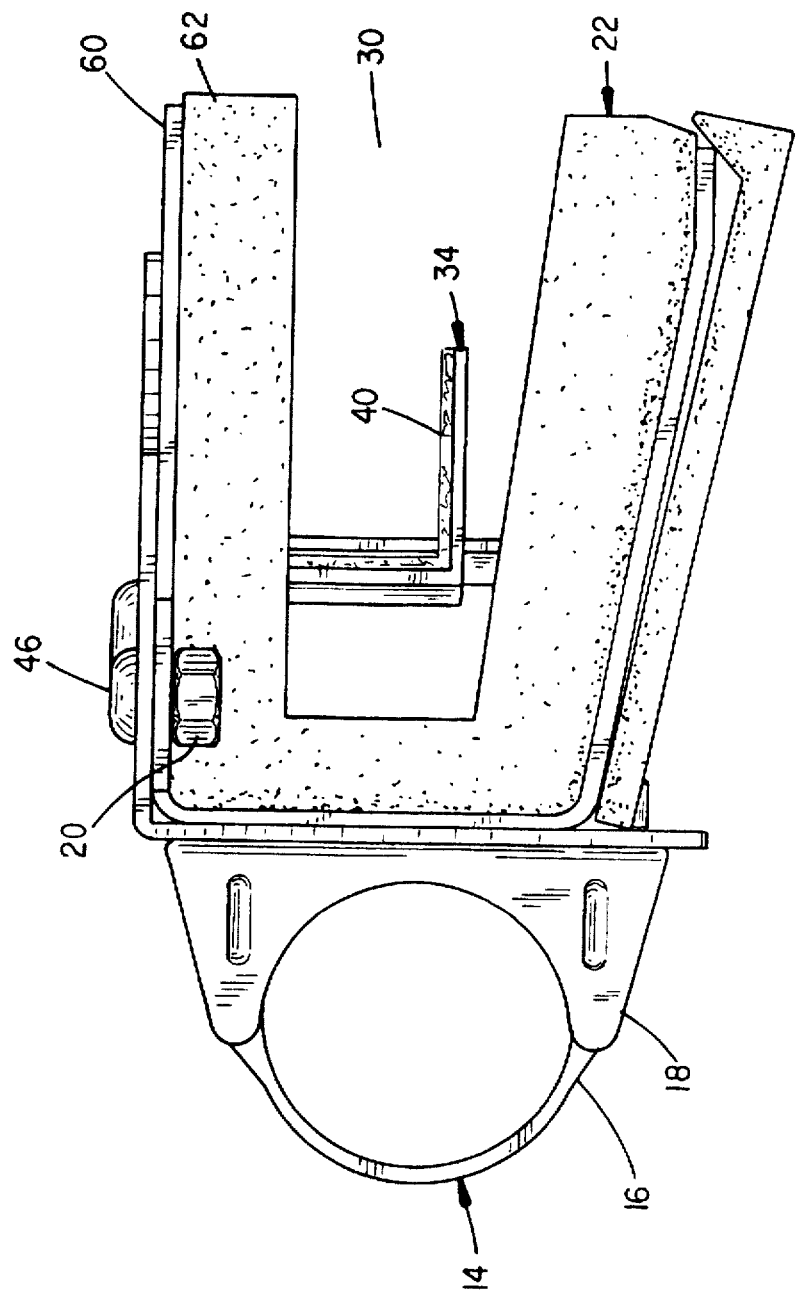
FIG. 8 is a left side elevation view of the firearm support.
Figure 9:
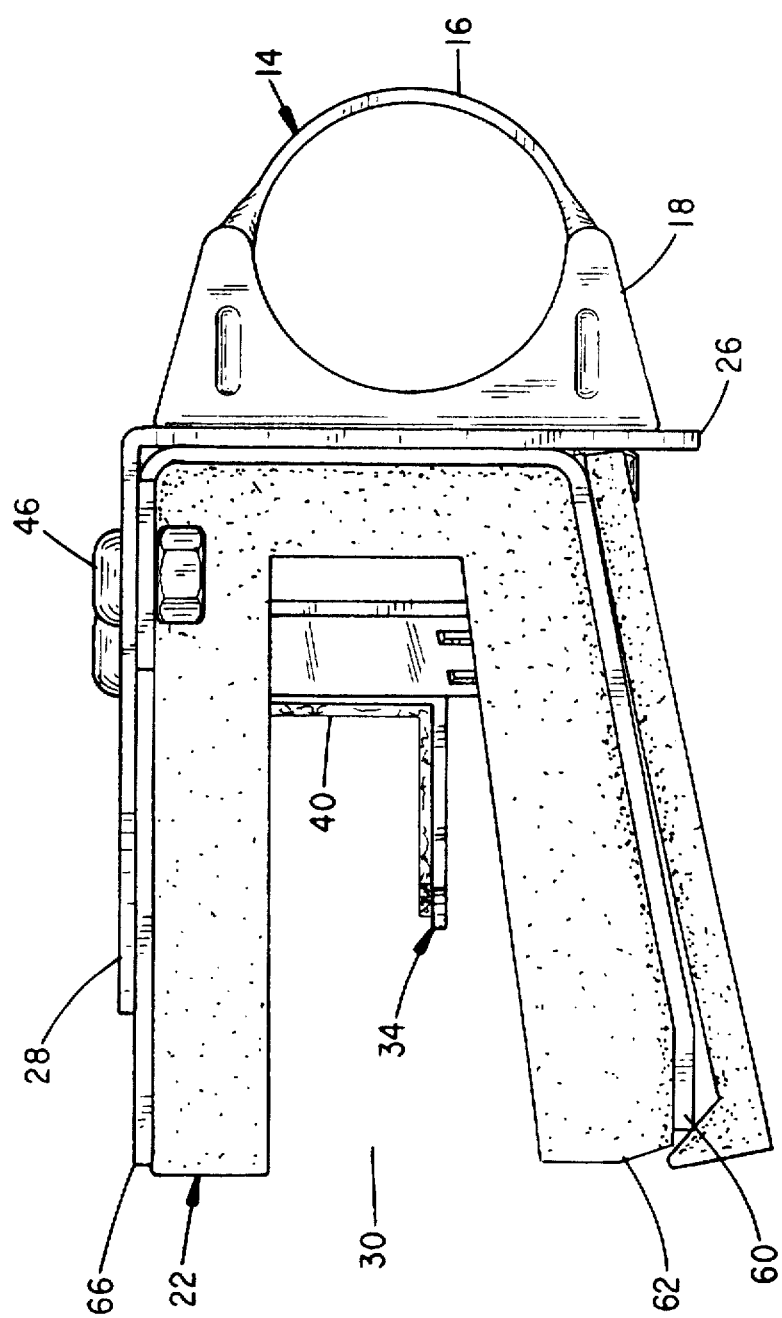
FIG. 9 is a right side elevation view of the firearm support.

The trigger shroud 34 is separately restrained to the top plate 26 at elongated slots 52 with a pair of threaded fasteners 46, reference FIG. 6. The trigger shroud 34 is typically adjusted, once the lock plate 42 has been positioned to support the firearm 4 without movement. A back plate 56 of the trigger shroud 34 is adjusted to abut the trigger guard of the supported firearm 4. A bottom plate 58 projects from the back plate 56 to completely cover the trigger and prevent accidental discharge of the firearm while supported to the support 2.

FIG. 10 depicts an alternative shroud 57 which typically mounts to the apertures 52. The shroud 57 finds application to shield other critical portions of a firearm 4 beyond the trigger, such as fasteners, which if accessible, would permit the disassembly of the firearm 4 while seated in the support 2. The shroud 57 is substantially the same as the trigger shroud 34, except that it includes a plate 55 that extends parallel to a bottom plate 53. A cushion 51 mounts at the space between the plates 53, 55. Either of the plates 53, 55 may also include bent vertical portions which parallel a back plate 49.

Depending on the type of vehicle, the relative sizing of the back and bottom plates 26, 28 can be varied. Additional slots may also be provided at the top plate 26 to accommodate differing types of firearms. Similarly, other apertures may be provided at the bracket 24 to vary the lateral displacement of the lock plate 42 from the trigger shroud 34.

The cradles 22 are secured to the top plate 26 with threaded fasteners 46 adjacent the trigger shroud 34 and the lock assembly 32. The cradles 22 are constructed of a "C" shaped metal core 60 that is approximately one inch wide and provides a 4 inch deep recess 30. Each core 60 is retained to the top plate 26 at upper flanges of the core 60.

Exposed surfaces of the core 60 are covered with the cushions 23. The cushions 23 are constructed of a material, similar to the cushions 39 and 40, and which material maintains its resilience over time. The cushions 23 compress slightly upon the mounting of a firearm 4. The position of the cores 60 can be adjusted at the bracket 24 at provided slots 68 in the top plate 26.

Collectively, the slotted apertures 48, 52 and 68 accommodate a wide range of adjustments for properly fitting the firearm 4 to the support assembly 2. All fasteners 46 are presently mounted to depend from the top plate 26 such that with the fitting of the support bracket 24 in close association to the vehicle ceiling, the fasteners 46 cannot be accessed without difficulty. Lock nuts 20 are used at the exposed lower portion of the fasteners 46. The placement of the firearm 4 within the support 2 also covers the nuts 20 to essentially eliminate tampering with the support 2. Recessed hexagon cavities 70 are also provided in each fastener 46 to make unauthorized access more difficult.

Depending upon the configuration of the vehicle and whether a roll bar 6, divider 8 or telescoping support 10 is provided, the back plate 28 is appropriately restrained to the vehicle support 2 with the clamp brackets 14. Additional apertures can also be provided at the back and top plates 26, 28 to accept threaded fasteners which mount directly to a divider 8 and/or the vehicle ceiling.

When the support 2 is mounted to either a roll bar 6 or a telescoping support 10, the clamp brackets 14 typically restrain the support bracket 24 to the tubular bars. The threaded yoke 16 and mating bracket 18 are particularly shaped to accommodate the mounting. Upon tightening the nuts 20, the yoke 16 draws the intervening tubular support 6 or 10 tight against clamp bracket 18 and restrains the support 2 to the vehicle. The clamps 14 are also positioned to shelter the nuts 20 behind the lock plate 42 and trigger shroud 34 and hamper access to the yoke 16. Although clamps 14, which accommodate cylindrical tube stock, are shown, the clamps 14 can be constructed to accommodate other tube shapes.

Also included at the bracket 24 are cut out regions 72 and 74 at the top and back plates 26 and 28 to accommodate possible lights which are fitted to the vehicle. Although, too, the bracket 24 is shown in a fixed length construction that is formed as a single piece, the bracket 24 can be constructed of a number of interconnecting, length extensible sections which allow the expansion or retraction of the sections and also the yokes 22, lock 32 and shroud 34 from one another.

While the invention has been described with respect to a presently preferred construction and various other considered alternative constructions, still other assemblies or combinations may be suggested to those skilled in the art. The scope of the invention should therefore be broadly construed to include all equivalent embodiments within the scope of the following appended claims.

What is claimed is:

1. A support for a firearm comprising:
a) a bracket having coextensive top and back plates extending orthogonal to one another;
b) first and second cradle means mounted to depend beneath said top plate and forward of said back plate and each having a recess for supporting a portion of the firearm within the recess;
c) a lock plate mounted to depend beneath said top plate and forward of said back plate;
d) lock means mounted to said lock plate for encircling and containing the barrel of the firearm; and
e) a trigger shroud mounted beneath said top plate and forward of said back plate and having a web which projects parallel to said top plate and defines a storage space for containing the trigger of the firearm between said top plate and said web, whereby the firearm is supportable beneath said top plate and forward of said back plate with restricted access to the trigger.

2. Apparatus as set forth in claim 1 wherein said support includes clamp means for restraining said bracket to a tubular vehicle support.

3. Apparatus as set forth in claim 2 wherein said clamp means includes a U-shaped yoke mounted to secure said vehicle support between the yoke and bracket.

4. Apparatus as set forth in claim 2 wherein fasteners which secure said first and second cradle means, said shroud, said lock plate, and said clamp means to said bracket are concealed by the supported firearm.

5. Apparatus as set forth in claim 2 wherein the vehicle support spans the interior of a vehicle, wherein an end bracket of said vehicle support mounts to a vehicle bracket affixed to said vehicle and including means for longitudinally adjusting the location of said end bracket relative to the vehicle bracket.

6. Apparatus as set forth in claim 5 wherein the vehicle bracket includes a slideway which receives fasteners securing the end bracket to the vehicle bracket.

7. Apparatus as set forth in claim 1 wherein said first and second cradle means are fastened to said top plate and wherein each cradle means includes a firearm support cushion.

8. Apparatus as set forth in claim 1 wherein at least one of said top and back plates includes a notched cutout.

9. Apparatus as set forth in claim 1 wherein said trigger shroud includes a second web that projects parallel to said top plate and wherein the storage space is defined between the webs.

10. Apparatus as set forth in claim 9 wherein said trigger shroud exhibits a "C" shape when viewed in side profile.

11. Apparatus as set forth in claim 1 wherein said top plate and said lock plate include a plurality of slotted apertures that permit adjustment of the relative mounting positions of said first and second cradle means, said lock means supportable beneath said top plate and forward of said back plate with restricted access to the trigger.

12. A support for a firearm comprising:
a) a bracket having coextensive top and back plates extending orthogonal to one another and each including a notched cutout;
b) a cradle mounted to depend from said top plate and forward of said back plate and having a firearm support recess covered with a cushion;
c) a lock plate mounted to depend from said top plate and forward of said back plate;
d) lock means mounted to said lock plate for encircling and containing the barrel of the firearm;
e) clamp means mounted to said bracket for restraining said bracket to a vehicle support;
f) a trigger shroud mounted to depend from said top plate and having a web which projects parallel to said top plate and defines a storage space for the trigger of the firearm between said top plate and said web; and g) wherein a plurality of fasteners accommodate the seating of the firearm within said cradle, said trigger shroud, and said lock means, whereby a firearm is supportable beneath said top plate and forward of said back plate with restricted access to the trigger.

13. Apparatus as set forth in claim 12 wherein an end bracket of said vehicle support mounts to a vehicle bracket, and wherein the vehicle bracket includes means for longitudinally adjusting the location of said end bracket relative to the vehicle bracket.

14. Apparatus as set forth in claim 13 wherein the vehicle bracket includes a raised slideway which receives fasteners that secure the end bracket to the vehicle bracket.

15. Apparatus as set forth in claim 12 including a second cradle mounted to said bracket and wherein said lock means and trigger shroud mount between the cradles.

16. Apparatus as set forth in claim 12 wherein said top plate and said lock plate include a plurality of slotted apertures that permit adjustment of the relative mounting positions of said first and second cradle means said lock means and said shroud means to one another.

17. Apparatus as set forth in claim 12 wherein said trigger shroud includes a second web that extends parallel to said to plate and wherein the storage space is defined between the webs.

* * * * *